United States Patent
Rao et al.

(10) Patent No.: US 12,355,796 B2
(45) Date of Patent: Jul. 8, 2025

(54) LOCATING SHADOW VULNERABLE DATASTORES FOR CLOUD DATA TABLE/API/DATA LAKE STORES

(71) Applicants: Supreeth Hosur Nagesh Rao, Cupertino, CA (US); Navindra Yadav, Cupertino, CA (US); Ravi Sankuratri, Cupertino, CA (US); Alok Lalit Wadhwa, Milipitas, CA (US); Aria Rahadian, San Jose, CA (US); Brady Schulman, Milforn, NH (US); Ravi Shanker Prasad, San Jose, CA (US); Vasil Dochkov Yordanov, San Jose, CA (US); Yiwei Wang, San Jose, CA (US); Zhiwen Zhang, San Jose, CA (US); Udayan Joshi, San Diego, CA (US); Soumyadeep Choudhury, San Jose, CA (US); Muhammada Furqan, Lowell, MA (US); Danesh Irani, San Jose, CA (US)

(72) Inventors: Supreeth Hosur Nagesh Rao, Cupertino, CA (US); Navindra Yadav, Cupertino, CA (US); Ravi Sankuratri, Cupertino, CA (US); Alok Lalit Wadhwa, Milipitas, CA (US); Aria Rahadian, San Jose, CA (US); Brady Schulman, Milforn, NH (US); Ravi Shanker Prasad, San Jose, CA (US); Vasil Dochkov Yordanov, San Jose, CA (US); Yiwei Wang, San Jose, CA (US); Zhiwen Zhang, San Jose, CA (US); Udayan Joshi, San Diego, CA (US); Soumyadeep Choudhury, San Jose, CA (US); Muhammada Furqan, Lowell, MA (US); Danesh Irani, San Jose, CA (US)

(*) Notice: Subject to any disclaimer, the term of this patent is extended or adjusted under 35 U.S.C. 154(b) by 469 days.

(21) Appl. No.: 17/711,031

(22) Filed: Apr. 1, 2022

(65) Prior Publication Data

US 2022/0407883 A1     Dec. 22, 2022

Related U.S. Application Data

(63) Continuation-in-part of application No. 17/335,932, filed on Jun. 1, 2021, now Pat. No. 12,010,124.
(Continued)

(51) Int. Cl.
   H04L 9/40          (2022.01)
(52) U.S. Cl.
   CPC .......... H04L 63/1433 (2013.01); H04L 63/20 (2013.01)
(58) Field of Classification Search
   CPC ........................... H04L 63/20; H04L 63/1433
   See application file for complete search history.

(56) References Cited

U.S. PATENT DOCUMENTS

| | | | |
|---|---|---|---|
| 9,104,859 B1 * | 8/2015 | Banerjee | H04L 63/1408 |
| 2021/0117549 A1 * | 4/2021 | Mandagere | G06F 11/1446 |
| 2022/0046059 A1 * | 2/2022 | Pandurangi | H04L 63/20 |

* cited by examiner

Primary Examiner — Thaddeus J Plecha

(57) ABSTRACT

In one aspect, a computerized method for locating one or more shadow vulnerable datastores for cloud-platform datastores includes the step of identifying a cloned data store of an original datastore in a cloud database instance. It includes the step of determining that the cloned datastore comprises a shadow vulnerable datastore. It includes the step of defining a security posture of the cloned datastore. It includes the step of publishing a digitized data clone security differential report comprising the security posture and one or more remediations to fix security posture issues.

11 Claims, 5 Drawing Sheets

Related U.S. Application Data

(60) Provisional application No. 63/153,362, filed on Feb. 24, 2021.

LOCATING SHADOW VULNERABLE DATASTORES FOR CLOUD DATA TABLE/API/DATA LAKE STORES

CLAIM OF PRIORITY

This application claims priority to U.S. patent application Ser. No. 17/335,932, filed on, and titled. The U.S. patent application Ser. No. 17/335,932 is hereby incorporated by reference in its entirety.

U.S. patent application Ser. No. 17/335,932 application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This utility patent application is incorporated herein by reference in its entirety.

FIELD OF INVENTION

This application is related to cloud-platform security and more specifically to locating shadow vulnerable datastores for cloud datastore/API/data lake stores.

BACKGROUND

With the advent of Cloud Databases (e.g. Snowflake®, Google Big Query®, Amazon Redshift®, etc.) an operation to copy a database table/store can be easily performed. Operations can be easily performed on Cloud Object Stores (e.g. S3®, etc.) to generate a copy of an existing object file. Unlike in traditional on-premises data centers, there is no perimeter protection technology for most Cloud Databases. In this scenario, a misconfiguration can lead to the entire database copy being exposed or wrongly to a different set of users. In DB-as-a-service offerings (e.g. Snowflake®, etc.), zero-copy cloning is also possible, which means there is no deep copying of data but an identical copy of the data gets created. Whenever a copy of the data is created or a table/store is cloned, security teams may have a responsibility to ensure data is protected just like the original copy. The protection may mean security teams will need a way to ensure that the same security posture or an acceptable security posture for the new clone needs to be present.

SUMMARY OF THE INVENTION

In one aspect, a computerized method for locating one or more shadow vulnerable datastores for cloud-platform datastores includes the step of identifying a cloned data store of an original datastore in a cloud database instance. It includes the step of determining that the cloned datastore comprises a shadow vulnerable datastore. It includes the step of defining a security posture of the cloned datastore. It includes the step of publishing a digitized data clone security differential report comprising the security posture and one or more remediations to fix security posture issues.

Figure 1:
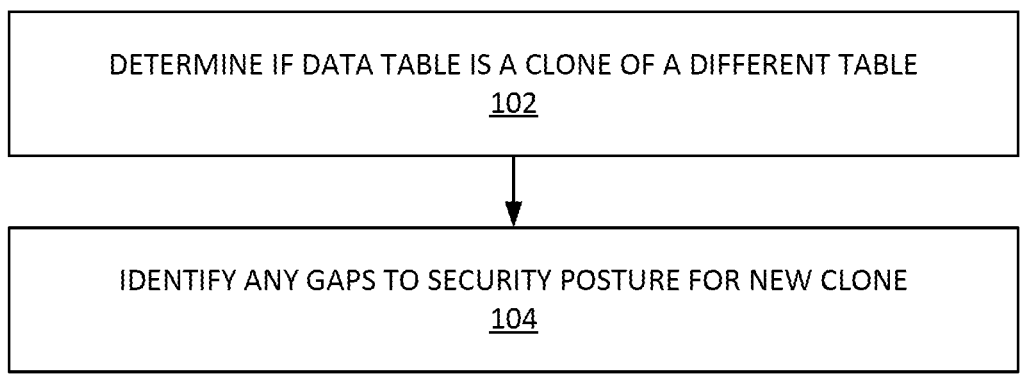
FIG. 1 illustrates an example process for analyzing a datastore, according to some embodiments.

The Figures described above are a representative set and are not exhaustive with respect to embodying the invention.

DESCRIPTION

Disclosed are a system, method, and article for locating shadow vulnerable datastores for cloud data table/API/data lake stores. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

Cloud computing is the on-demand availability of computer system resources, especially data storage (e.g. cloud storage) and computing power, without direct active management by the user.

Cloud storage is a model of computer data storage in which the digital data is stored in logical pools, said to be on "the cloud". The physical storage spans multiple servers (e.g. in multiple locations), and the physical environment is typically owned and managed by a hosting company. These cloud storage providers can keep the data available and accessible, and the physical environment secured, protected, and running.

DBaaS (Database as a Service) can be a cloud computing service that provides access to and use a cloud database system.

Data warehouse can be a system used for reporting and data analysis and is considered a core component of business intelligence.

Software as a service (SaaS) is a software licensing and delivery model in which software is licensed on a subscription basis and is centrally hosted.

Example Methods

FIG. 1 illustrates an example process 100 for analyzing a datastore, according to some embodiments. In step 102, process 100 can determine if a datastore is a clone of a different table/store. In step 104, process 100 can identify any gaps in security posture for the new clone. Gaps to security posture include, inter alia:

Contents of the table/store being the same, the table/store not being encrypted;
The cloned copy is exposed to a different set of users;
The cloned copy is being shared out to different third-party vendors; and/or
The cloned copy of data is accessed with different sets of query patterns. These factors can be utilized to determine/ensure that the gap is a 'true' gap as such.

Security posture can be defined by, inter alia: clone is not encrypted, clone is exposed to a different set of users, clone has diff access levels from a public access perspective, clone is shared with diff vendors or third-party systems, etc.

Figure 2:
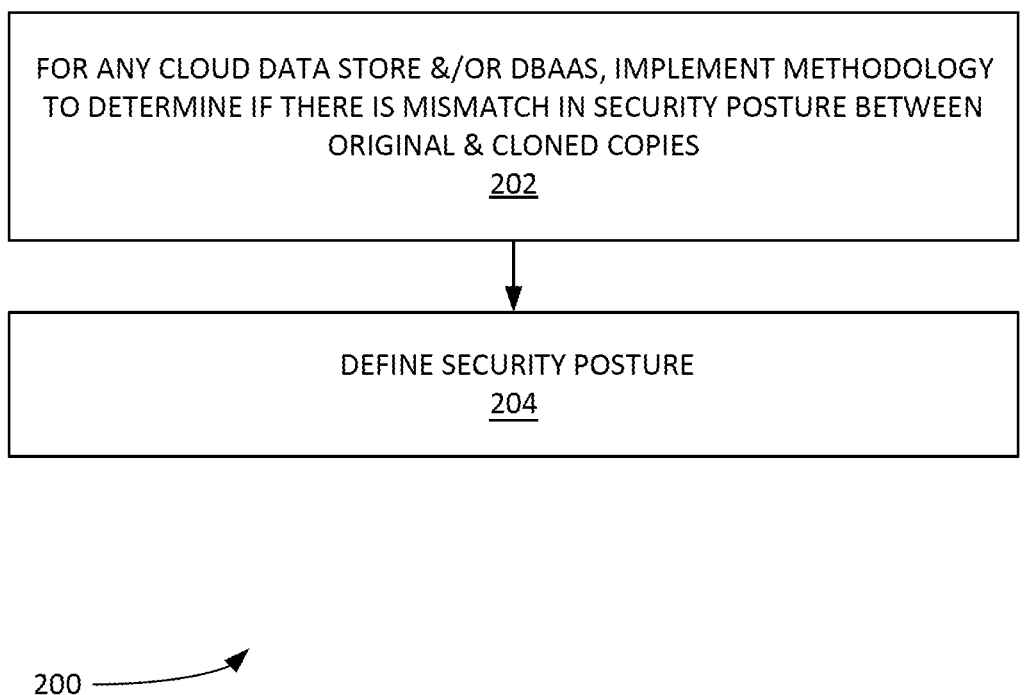
FIG. 2 illustrates an example process for locating shadow vulnerable datastores for cloud datastore/API/data lake stores, according to some embodiments.

FIG. 2 illustrates an example process 200 for locating shadow vulnerable datastores for cloud datastore/API/data lake stores, according to some embodiments. In step 202, process 200, for any cloud datastore and/or Database as a service (DBaaS), implements a methodology to determine if there is a mismatch in security posture between original and cloned copies. In step 204, process 200 defines a security posture (e.g. based on the output of process 300, etc.).

Figure 3:
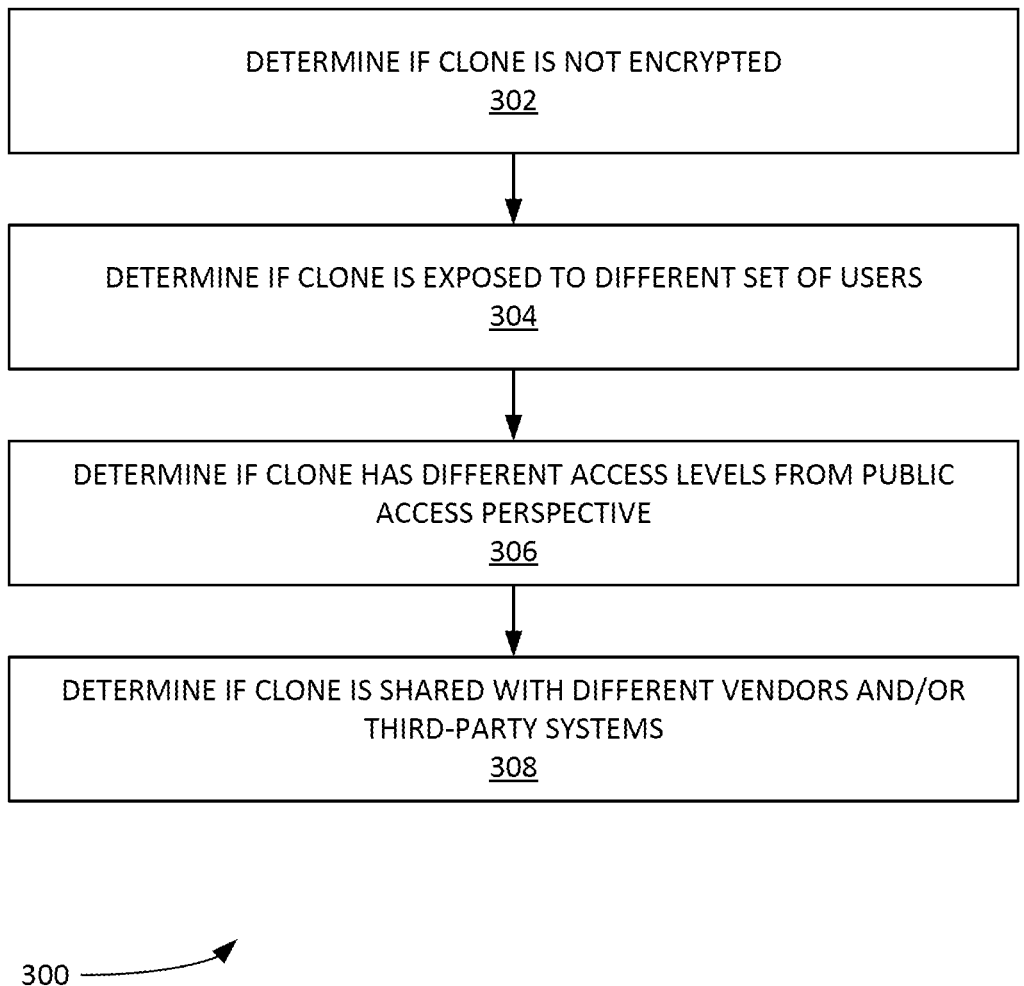
FIG. 3 illustrates an example process for defining a security posture, according to some embodiments.

FIG. 3 illustrates an example process 300 for defining a security posture, according to some embodiments. In step 302, process 300 can determine if a clone is not encrypted. In step 304, process 300 can determine if the clone is exposed to a different set of users. In step 306, process 300 can determine if the clone has different access levels from a public access perspective. In step 308, process 300 can determine if the clone is shared with different vendors and/or third-party systems.

Figure 4:
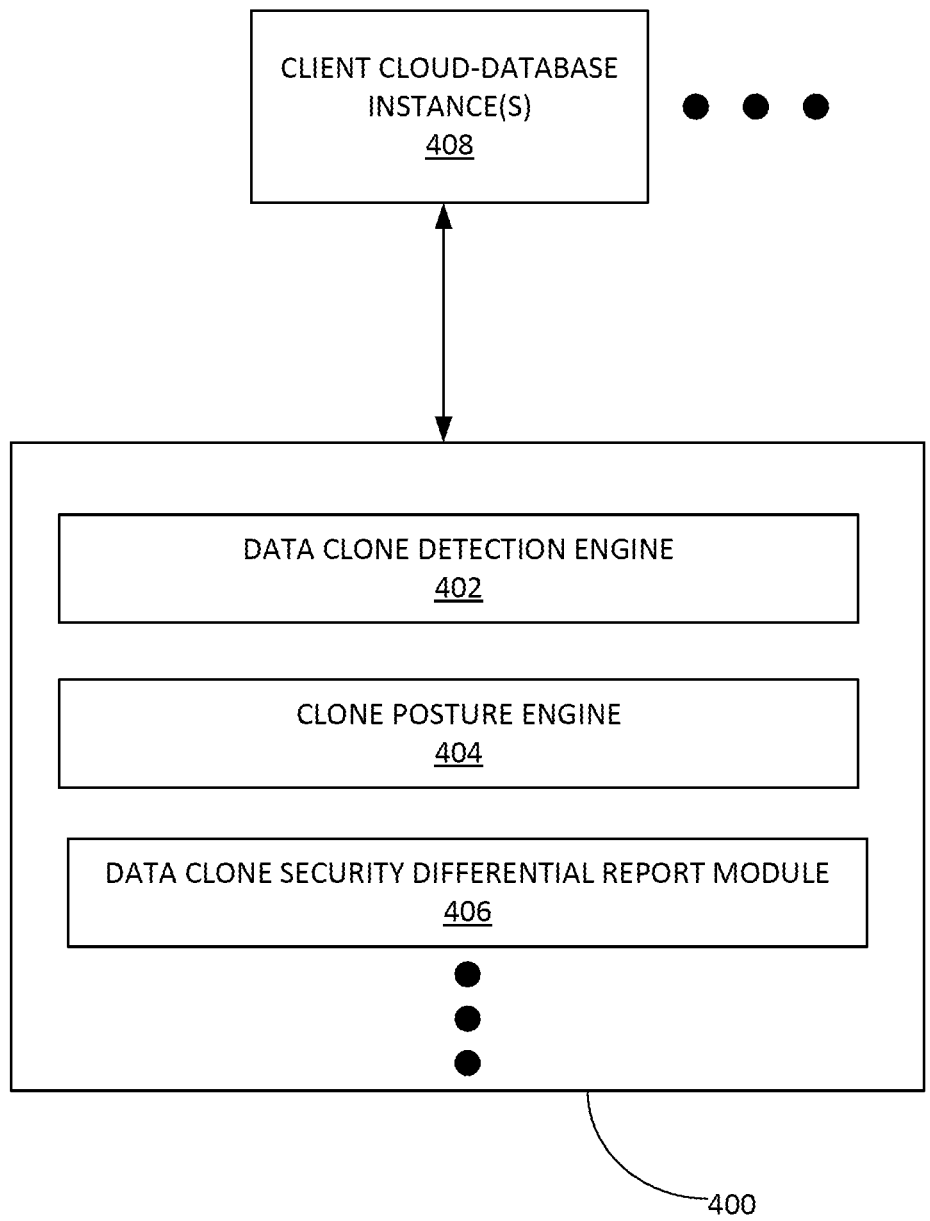
FIG. 4 illustrates an example system for locating shadow vulnerable datastores for cloud datastore/API/data lake stores, according to some embodiments.

FIG. 4 illustrates an example system 400 for locating shadow vulnerable datastores for cloud datastore/API/data lake stores, according to some embodiments. System 400 can analyze data within customers' cloud-computing and SaaS environments.

This understanding helps system 400 classify and identify the entities associated with each of the data stores. Along with details of cloned operation logs and entity similarity, data clone detection engine 402 can implement processes 100-300 Data clone detection engine 402 can implement process 500. System 400 can be used to provide shadow vulnerable store detection.

Figure 5:
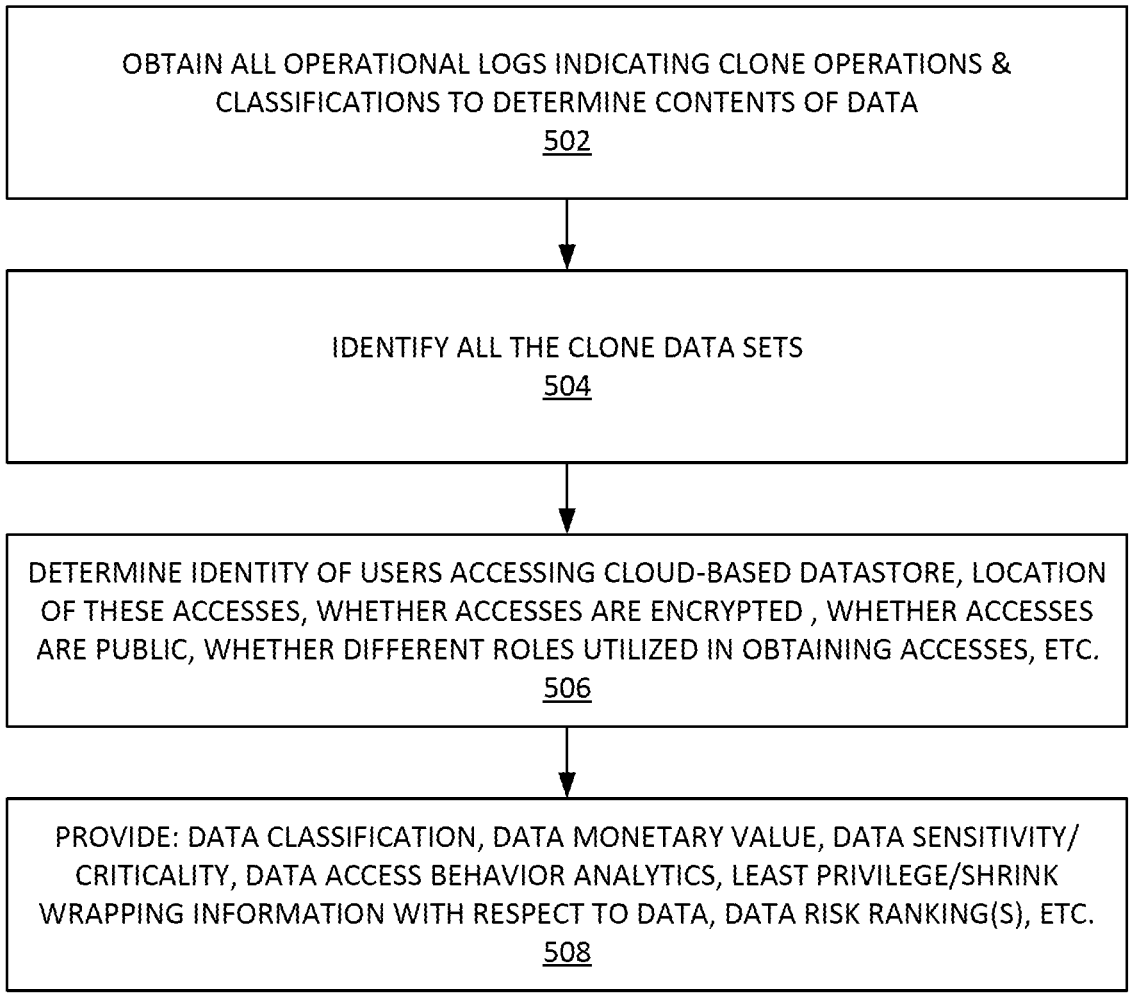
FIG. 5 illustrates an example process of a data clone detection engine, according to some embodiments.

FIG. 5 illustrates an example process 500 of a data clone detection engine, according to some embodiments. In step 502, process 500 obtains all operational logs indicating clone operations and classifications to determine the contents of the data. Step 502 obtains entities with a datastore as well. In step 504, process 500 identifies all the clone data sets. In step 506, process 500 maps the various relationships of cloned datasets to security properties, to access types back to the entity containment that it has identified for cloned and original datasets. In step 506, process 500 use data clone detection engine 404 to determine, inter alia: the identity of users accessing cloud-based datastore, location of these accesses, whether accesses are encrypted (or not), whether accesses are public or private, whether there are different roles utilized in obtaining accesses, etc. It is noted that public access can be defined as access that would allow the datastores to be reachable from a public network including from the Internet. Private access can allow the datastore to be only accessible by a private network, something which is confined to the enterprise or a VPC or subset of an enterprise.

In step 508, process 500 determines and provides the following: data classification, data monetary value, data sensitivity/criticality, data access behavior analytics, least privilege/shrink wrapping information with respect to data, data risk ranking(s), etc.

Client cloud database instance(s) 408 can be, inter alia: EC2, RDS, data warehouses, datastores, etc. Client cloud database instance(s) 408 can be operative in a cloud computing-based data warehouse (e.g. a Snowflake® cloud computing-based data warehouse, an AWS cloud computing-based data warehouse, etc.).

Once the cloned relationships are available, data clone posture engine 404 can analyze the values for access, encryption type, access-type (e.g. public, private, VPC only, etc.), and shares to come up with a differential that can indicate the security posture gaps between cloned and original datasets. Data clone posture engine 404 can determine, inter alia: the identity of users accessing cloud-based datastore, location of these accesses, whether accesses are encrypted (or not), whether accesses are public or private, whether there are different roles utilized in obtaining accesses, etc. In one example, a high-level example of roles can be, inter alia: based on departments within the entity (e.g. HR, Finance, Risk, Advertising, Marketing, etc.); based on responsibility (e.g. administrator, read-only, query-executor, report-executor, report-reader etc.); and the like.

The data clone security differential report can be a report of the determinations of the data clone detection engine 402 and/or the data clone posture engine 404. The data clone security differential report can include remediations to fix the security posture issues that have been identified. This is presented as a report with remediation within the user interface (UI) managed and provided by data clone security differential report module 408.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by this United States patent:

1. A computerized method for locating one or more shadow vulnerable datastores for cloud-platform datastores, comprising:
    identifying a cloned data store of an original datastore in a cloud database instance;
    determining that the cloned datastore comprises a shadow vulnerable datastore;
    defining a security posture of the cloned datastore; and
    publishing a digitized data clone security differential report comprising the security posture and one or more remediations to fix security posture issues.

2. The computerized method of claim 1, wherein the step of identifying the cloned datastore of an other datastore further comprises:
    with a data clone detection engine:
    obtaining one or more operational logs for all datastores within an enterprise; and
    using the one or more operation logs to determine a plurality of clone operations and classifications to determine a contents of the data in the original datastore.

3. The computerized method of claim 2, wherein the step of identifying the cloned datastore of the other datastore further comprises:
    obtaining a plurality of identities of a plurality of entities with a datastore; and
    identifying a plurality of clone data sets.

4. The computerized method of claim 3, wherein the step of identifying the cloned datastore of the other datastore further comprises:
    mapping all a plurality of relationships of the plurality of cloned datasets to a plurality of specified security properties.

5. The computerized method of claim 3, wherein the step of identifying the cloned datastore of the other datastore further comprises:
    identifying all a plurality of users accessing cloud-based datastore;
    identifying each location of the plurality of users accessing cloud-based datastore;
    determining whether accesses are encrypted;
    determining whether the accesses are public or private, and
    determining whether there are different roles utilized in obtaining access.

6. The method of claim 1, wherein the step of determining that the cloned datastore comprises a shadow vulnerable datastore further comprises:
    determining that there is a mismatch in one or more security postures between the original datastore and the cloned datastore.

7. The method of claim 1, wherein the security posture comprises a plurality of security posture gaps.

8. The method of claim 7, wherein the step of defining a security posture of the cloned datastore further comprises:
    determining that the cloned datastore is not encrypted; and
    determining that the cloned datastore is exposed to a different set of users than the original datastore is exposed to.

9. The method of claim 6, wherein the step of defining a security posture of the cloned datastore further comprises:
    determining that the cloned datastore is has a different set of access levels from a public access perspective than the original datastore.

10. The method of claim 7, wherein the step of defining a security posture of the cloned datastore further comprises:
    determining that the cloned datastore is shared with a different set of vendors than the original datastore; and
    determining that the cloned datastore is shared with a different set of third-party systems than the original datastore.

11. The method of claim 1, wherein the cloud database instance is operative in a cloud computing-based data warehouse.

\* \* \* \* \*